United States Patent [19]

Winchell

[11] E Patent Number: Re. 32,031

[45] Reissued Date of Patent: Nov. 19, 1985

[54] CAMBERING VEHICLE

[75] Inventor: Frank J. Winchell, Orchard Lake, Mich.

[73] Assignee: General Motors Corporation, Detroit, Mich.

[21] Appl. No.: 457,759

[22] Filed: Jan. 13, 1983

Related U.S. Patent Documents

Reissue of:

[64] Patent No.: 4,325,565
Issued: Apr. 20, 1982
Appl. No.: 126,877
Filed: Mar. 3, 1980

[51] Int. Cl.[4] ..... B62K 5/02

[52] U.S. Cl. ..... 280/282; 180/210; 280/112 A; 280/220

[58] Field of Search ..... 280/282, 220, 210

[56] References Cited

U.S. PATENT DOCUMENTS

| | | | |
|---|---|---|---|
| 3,504,934 | 6/1966 | Wallis | 180/210 |
| 3,583,507 | 6/1971 | Trautwein | 180/5 |
| 3,605,929 | 9/1971 | Rolland | 180/211 |
| 3,698,502 | 10/1972 | Patin | 280/111 X |
| 3,746,118 | 7/1973 | Altorfer | 280/112 A |
| 3,938,609 | 2/1976 | Kensaku et al. | 280/112 R |
| 4,064,957 | 12/1977 | Parham | 280/112 A X |
| 4,087,106 | 5/1978 | Winchell | 280/220 |
| 4,088,199 | 5/1978 | Trautwein | 180/41 X |
| 4,159,752 | 7/1979 | Kanno | 280/282 |

FOREIGN PATENT DOCUMENTS

| | | | |
|---|---|---|---|
| 2429238 | 9/1975 | Fed. Rep. of Germany | 180/210 |
| 53217 | 10/1945 | France | 280/112 A |
| 2014094 | 8/1979 | United Kingdom . | |

*Primary Examiner*—Joseph F. Peters, Jr.
*Assistant Examiner*—Mitchell J. Hill
*Attorney, Agent, or Firm*—Charles R. White

[57] ABSTRACT

A three-wheeled cambering vehicle having a platform for supporting the vehicle operator and having a pair of laterally spaced rear wheels mounted thereon. The vehicle has a centralized tubular frame with a front leg member that supports a steerable front fork and wheel assembly and a rearward seat for the vehicle operator. A lower leg of the frame is supported for turning movement with respect to a longitudinal roll axis by the platform which permits the frame and front fork and wheel assembly to be cambered by the vehicle operator as the platform remains in a predetermined plane with respect to the support surface.

8 Claims, 8 Drawing Figures

CAMBERING VEHICLE

Matter enclosed in heavy brackets [ ] appears in the original patent but forms no part of this reissue specification; matter printed in italics indicates the additions made by reissue.

This invention relates to a new and improved three-track cambering vehicle for supporting an operator in a seated position while allowing the operator to impart balancing moments into the vehicle through his feet selectively positioned on a platform carried by the vehicle frame and maintained in a substantially fixed plane by rear contacts as a front steering assembly, the frame and attached seat are cambered with respect to the platform.

Prior to the present invention, narrow three-track cambering vehicles have had various suspension arrangements so that the vehicle frame and wheels or other surface contact means could be cambered for improved mobility and stability. For example, my prior U.S. Pat. No. 4,087,106 for Cambering Vehicle issued May 2, 1978 discloses a vehicle in which trailing arms are pivotally mounted to a front frame member so the front and rear contacts can be cambered with the frame to permit a vehicle operator, preferably while standing, to lean with the vehicle in a natural manner to execute cornering and other vehicle maneuvers with a high degree of stability. While my prior cambering vehicle provided a highly stabilized and maneuverable vehicle and functioned as intended, it was determined that a somewhat similar vehicle having a platform maintained in a fixed plane with respect to the ground was desirable so that a seated operator could put balancing moments into the vehicle as it is being maneuvered using the platform as a moving ground. To this end the present invention is drawn to a lightweight three-place contact cambering vehicle in which a steerable front contact and a centralized vehicle frame with a seat for operator support can be cambered while a platform remains in a substantially horizontal plane; i.e., a plane, fixed with respect to the supporting surface. Laterally spaced rear contacts are carried by the platform and cannot be cambered with the frame, seat, and front contact. The platform, in effect, provides a ground moving with the vehicle on which the seated operator places his feet spread apart on opposite sides of the vehicle roll axis. In this position, the operator preferably performs coordinated cambered vehicle maneuvers such as high-speed cornering without utilization of foot balance input. If, however, there is a loss of balance, the operator can selectively impart left and right balancing loads through feet grounded on the platform to regain balance and to thereby improve control. When the vehicle is at a standstill, the operator can impart foot balancing moments to the platform to maintain the vehicle upright and ready for movement without his feet contacting the roadway on opposite sides of the vehicle, as would be the case with a conventional motorcycle or mo-ped. While the operator preferably drives the vehicle while seated, he may optionally stand on the support platform during vehicle operation including all maneuvers.

It is a feature, object and advantage of this invention to provide a new and improved cambering vehicle with a centralized cambering frame supporting a steerable front ground contact and an operator supporting seat; a platform for receiving the feet of the operator and rockably supporting the frame is stabilized with respect to the supporting surface by laterally spaced rear contacts carried thereby to allow the operator to impart balancing moment to the vehicle through his feet as the vehicle frame, seat and front contact are cambered.

Another feature, object and advantage of this invention is to provide a new and improved narrow-track vehicle with high lateral acceleration potential produced by cambering the main frame and a steerable front wheel; laterally spaced rear wheels are mounted on a generally horizontal platform which remains in a plane substantially fixed with respect to the ground during cornering and other vehicle maneuvers.

Another feature, object and advantage of this invention is to provide a new and improved three-wheel cambering vehicle having a frame with an operator's seat fixed thereto which incorporates a new and improved platform that carries the rear wheels and rockably supports the frame for cambering movement and that remains substantially parallel with respect to the support surface during vehicle maneuvers including cambering of the steering wheel, seat and frame.

Another feature, object and advantage of this invention is to provide a new and improved cambering vehicle having a steerable front support mounted on a cambering frame extending along longitudinal axis of the vehicle and having a pair of laterally spaced rear supports and platform mounted on the cambering frame in a manner such that the platform remains substantially parallel to the support surface as the frame and front contact are cambered.

These and other features, objects and advantages of this invention will be more apparent from the following detailed description and drawings in which.

Figure 1:
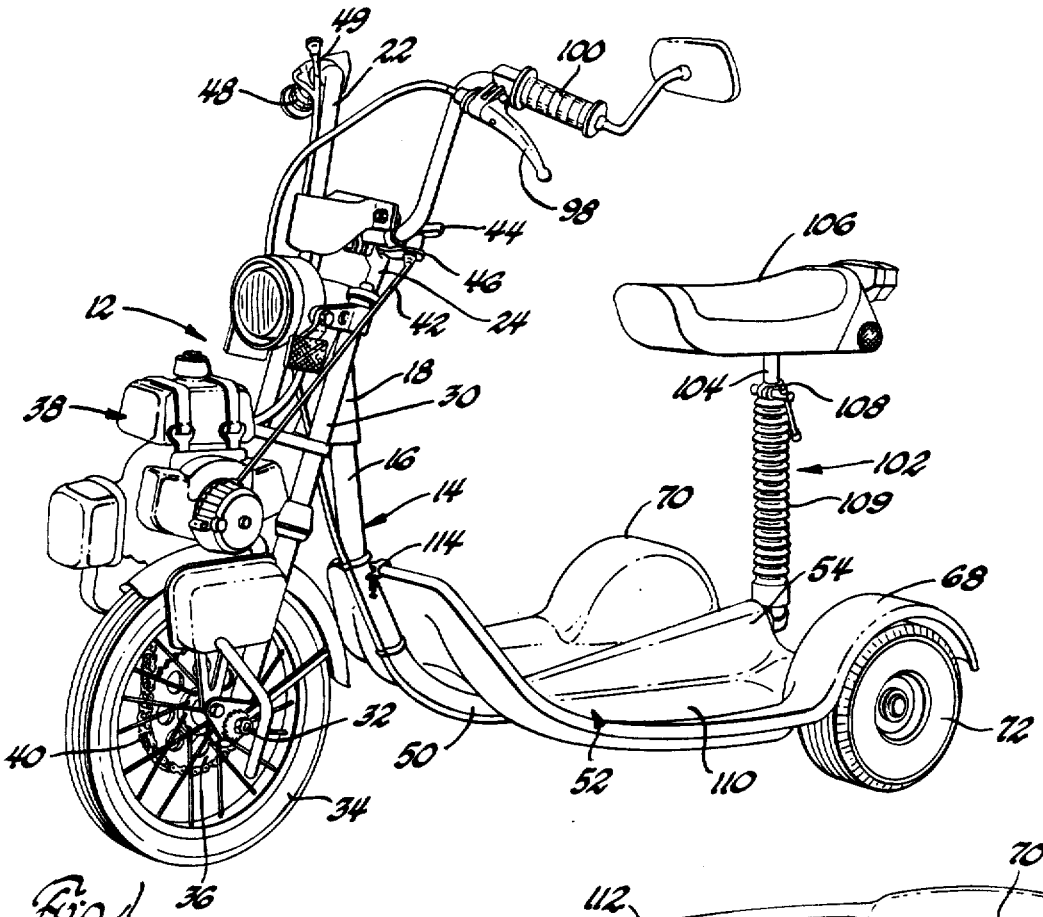
FIG. 1 is a perspective view of a vehicle illustrating a preferred embodiment of this invention.

Turning now in greater detail to the drawing, there is shown in FIG. 1 a three-wheeled cambering vehicle 12 for providing individual mobility for an operator. This three-track vehicle has a centralized tubular main frame 14, generally L-shaped in side view configuration with an upwardly inclined front leg portion 16. The forward leg portion supports at its upper end a tubular collar 18, inclined at a predetermined rake angle, in which a steering post 20 is rotatably journaled. The upper end of the steering post 20 is connected to a handlebar assembly 22 by a gooseneck type connection 24.

The steering post 20 may be turned in clockwise or counterclockwise direction within the collar 18 by the manual actuation of the handlebar assembly 22 by a vehicle operator sitting or standing on the vehicle. The steering post 20 is connected by upper bracket 26 and lower bracket 28 to an inclined dual bar steering fork assembly 30.

A front axle 32 supported on the lower end of the fork assembly 30 rotatably mounts a front road wheel 34 steerable through the turning of the fork assembly through the steering post and handlebar assembly. A sprocket 36, drivingly connected to the front wheel 34, is driven by an internal combustion engine 38 through an endless chain 40. The engine mounted to the front fork assembly may be started by pulling a starter cable 42 by means of a handle 44 mounted on the gooseneck connection 24 by a bracket 46. Engine speed is controlled through a rotatable handlebar grip 48 operatively connected through a suitable cable to the throttle valve of the engine. Pull cable 49 mounted on the handlebar assembly adjacent to the grip 48 controls the engine choke.

The tubular main frame 14 extends in a longitudinal plane that bisects the vehicle. In addition to leg portion 16, the main frame has a lower leg portion 50 that extends rearwardly and slightly upwardly from the bottom of the front leg portion 16. The central longitudinal axis A of the lower leg portion 50 describes the roll axis of the vehicle and is inclined at a predetermined angle to intersect the support surface at, forward or aft of footprint P of the front wheel 34 to provide a selected steering characteristic.

An operator supporting platform 52 formed by a contoured shell is rockably mounted on the lower leg portion 50 of the main frame for cambering operations. To this end the platform 52 has a centralized and longitudinally extending tunnel 54 in which support tube 56 is mounted.

Figure 3:
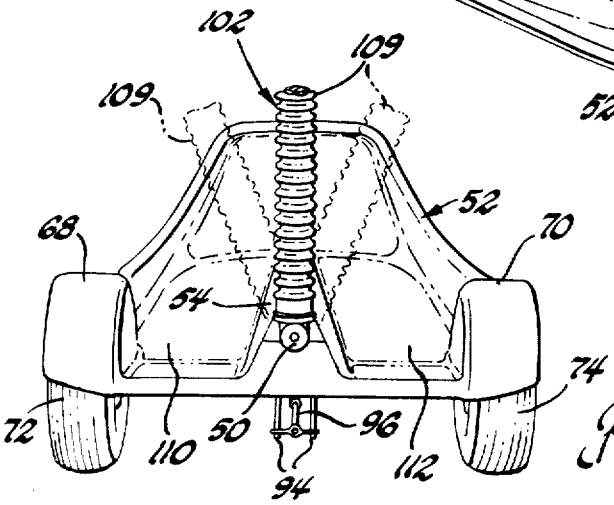
FIG. 3 is an end view of a portion of the vehicle of FIG. 1.
Figure 5:
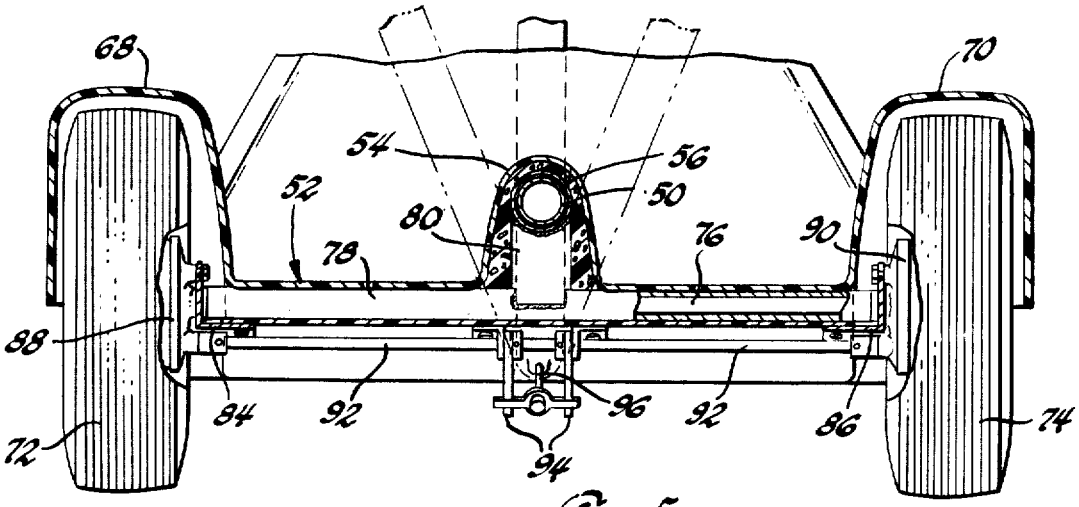
FIG. 5 is an end view, partially in section, of a portion of the vehicle of FIG. 1.

The lower leg 50 of the frame extends through and is rotatably mounted within the support tube 56 by respective front and rear bearings 58 and 60 which allow the main frame to be cambered clockwise or counterclockwise about axis A and with respect to the platform as illustrated in FIGS. 3 and 5.

Figure 7:
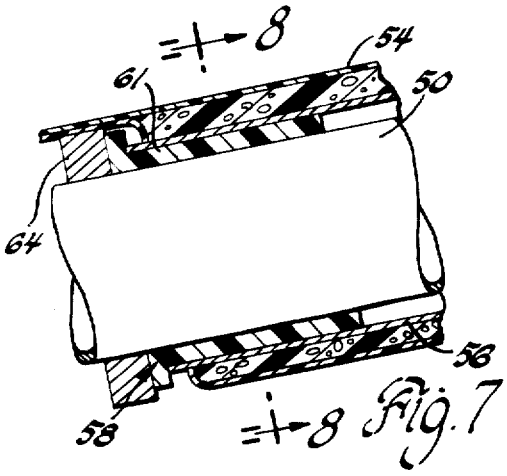
FIG. 7 is an enlarged view of a portion of the vehicle of FIG. 4.
Figure 8:
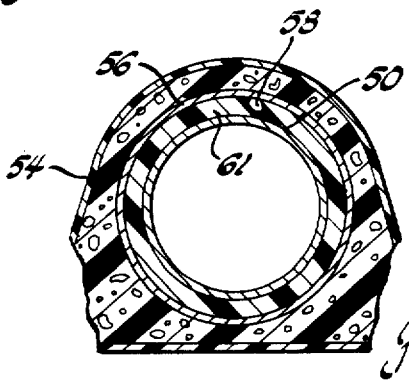
FIG. 8 is a cross-sectional view taken along lines 8—8 of FIG. 7 as viewed in the direction of the sight line arrows.

The bearings 58 and 60 are substantially the same in construction so that only bearing 58 is described in detail. As shown in FIGS. 7 and 8, the front bearing 58 comprises a cylindrical bushing 61 of nylon or other suitable material mounted in the forward end of the support tube 56. Annular retainer 64 mounted on the lower leg portion 50 immediately in front of the bushing 61 retains the bushing in place within the confines of the support tube.

Figure 2:
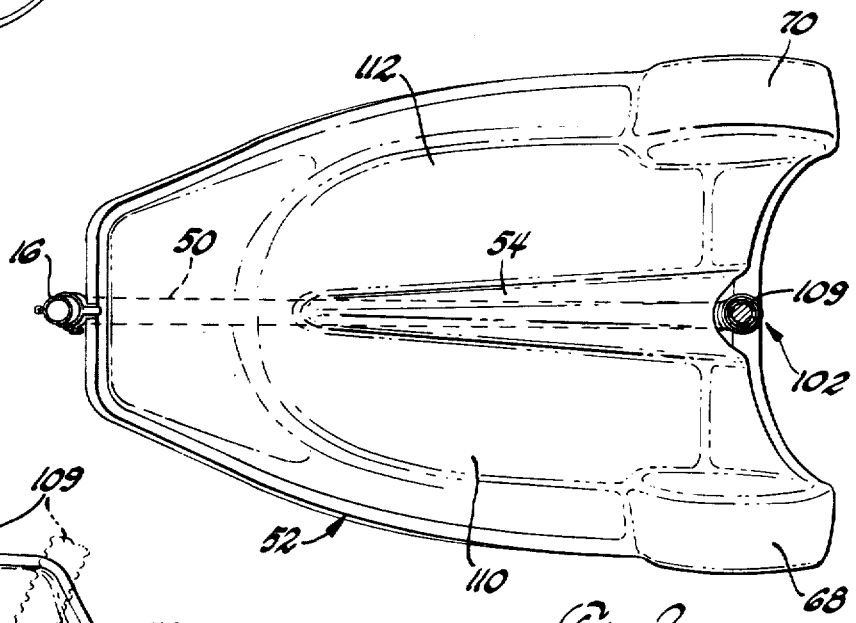
FIG. 2 is a top plan view of a portion of the vehicle of FIG. 1.
Figure 4:
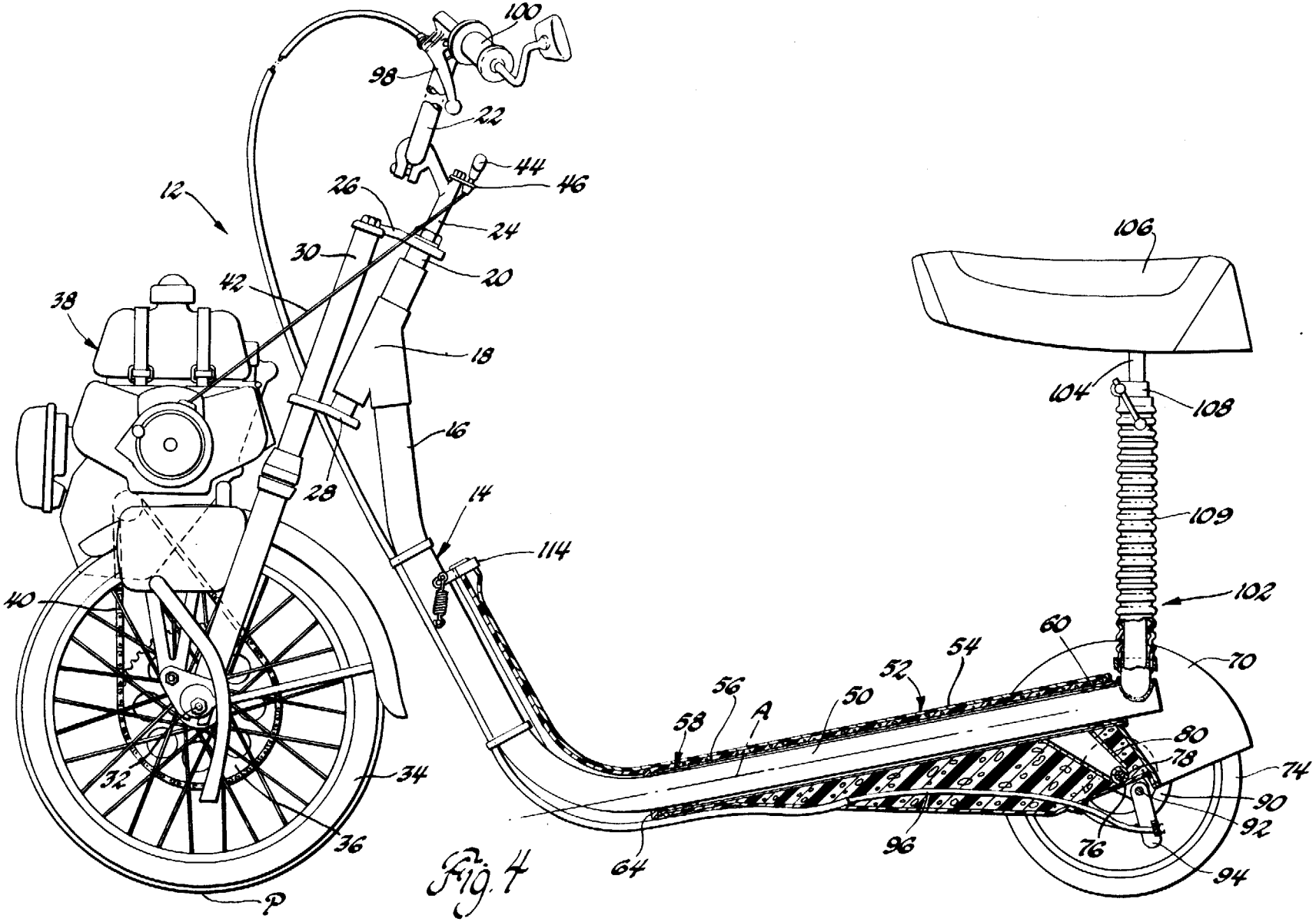
FIG. 4 is a side view, partially in section, of the vehicle of FIG. 1.
Figure 6:
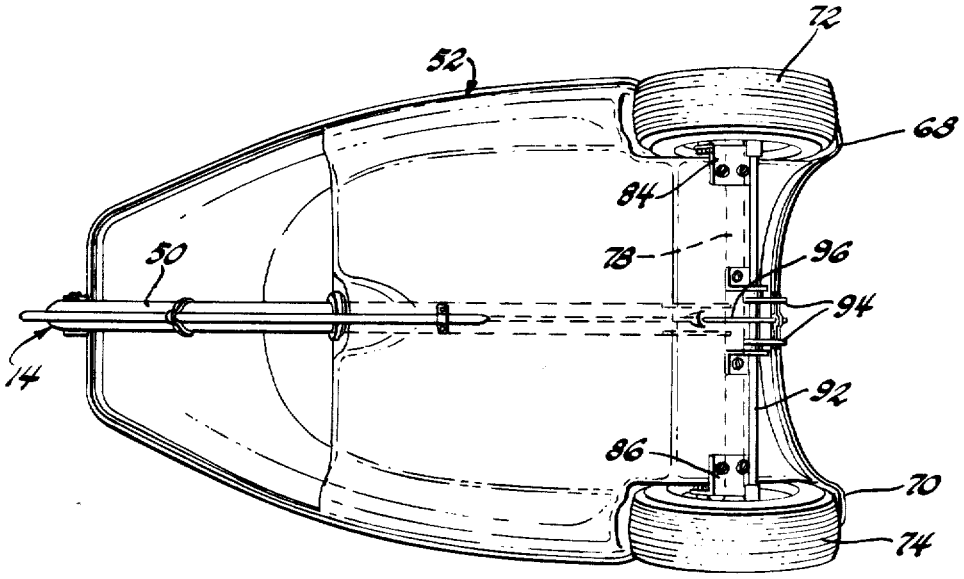
FIG. 6 is a bottom plan view, with parts broken away, of the vehicle of FIG. 1.

The platform 52 is a lightweight component and preferably is formed from a plastic shell filled with a reinforcing closed celled plastic material. In a top plan configuration, the platform is somewhat triangular as shown in FIGS. 2 and 6. The forward portion of this platform is arched upwardly as shown in FIGS. 1 and 4 while the rear corners are formed with arched fenders 68 and 70 to accommodate the laterally spaced rear wheels 72 and 74. The rear wheels are supported on a rear axle 76 which is mounted within a cylindrical cross tube 78 extending laterally across the rear end of the platform 52. The cross tube 78 is secured to aft end of the centralized support tube 56 by a depending arm 80 as best shown in FIGS. 4 and 5. The outboard ends of the cross tube 78 are secured by angular brackets 84 and 86 to the underside of the platform 52 as shown in FIG. 6. Mounted to the brackets 84 and 86 are left and right stationary housings 88 and 90 that contains cam-operated shoe brakes. These shoe brakes are engaged with associated brake drums not shown through a laterally extending brake shaft 92 turned by crank arms 94 on actuation of a braking cable 96 which extends along the bottom of the support platform and up to a manual brake lever 98 mounted on the handlebar assembly adjacent to left hand handlebar grip 100.

Extending upwardly from the rear end of the lower leg portion 50 of the frame 14 is a telescoping spring strut 102 assembly that incorporates the depending support post 104 of the saddle-type operator's seat 106. Seat height adjustment is made in conventional manner by loosening gripping collar 108, telescoping the seat post to set the seat at the desired height and retightening collar 108 to grip the seat post. The strut 102 is protected by a convoluted plastic cover 109.

The operator may be seated on the seat with his feet placed in any selected position on opposite sides 110, 112 of the platform including the outer preimeter thereof. Balancing moments can be imparted through the feet on the platform to keep the vehicle upright when stationary. The vehicle engine can then be started in conventional manner and the vehicle driven forwardly. With the platform moving in a relatively fixed plane, the operator can lean naturally into turns while seated during vehicle operation since the seat and its supporting spring strut are fixed to the cambering main frame and move through the same camber angle. With the platform riding in a fixed plane about the roadway and with the operator leaning into a turn along with the frame, seat and front steering assembly, the operator can, if necessary, impress loads onto the platform through his feet at all speeds from zero to maximum for lateral balancing. For example, when executing a sharp turn, the operator can steer the vehicle into the turn at a large camber angle. Normally the operator stays coordinated as on a motorcycle so that the vehicle is in equilibrium. If, however, an unbalanced condition occurs, the operator can use foot balance moments as required to regain vehicle equilibrium without his feet contacting the ground. With the moving platform serving as a ground, there would be no need for the operator using his feet for contact with the road surface to serve as a skid in order to impart balancing moments, as might be the case when cornering a conventional two-wheeled motorcycle. For evasive maneuvers, the operator can use his feet to camber the vehicle of this invention quicker than a conventional motorcycle can be cambered since no momentary steering input opposite to the direction of camber is necessary with this invention.

The vehicle can also be readily ridden with the operator standing in a natural manner on the platform. During such cornering operation, the operator can camber the vehicle by leaning the frame and the front steering fork for stabilized cornering at a wide range of vehicle speed. During the maneuvers, the platform will remain parallel or at a fixed angle with respect to the supporting surface.

With this narrow-track cambering vehicle, narrow and tortuous paths can be readily negotiated with a proper match of vehicle speed, camber angle and path curvature to maintain lateral stability. For parking, hook 114 pivoted to main frame leg 16 is moved from an upper over-center position into locking engagement with the apex of the platform to secure the platform to the main frame so that the vehicle will stand freely.

While a preferred embodiment of the invention has been shown and described to illustrate the invention, other modifications will become apparent to those skilled in the art. Accordingly, the scope of this invention is set forth in the following claims.

The embodiments of the invention in which an exclusive property or privilege is claimed are defined as follows:

1. A cambering vehicle for transporting a vehicle operator along a support surface, said vehicle comprising a centralized main frame having an upwardly extending forward frame member and a lower tubular frame member extending along the longitudinal axis of the vehicle rearwardly from the lower end of said forward frame member to the rear of said vehicle, steerable front wheel means supported by said forward frame member for contacting said support surface, manual steering means operatively connected to said steerable front wheel means, a seat for a vehicle operator attached to said lower frame member, a one-piece support platform extending to the rear of said vehicle from said forward frame member and laterally across said lower frame member for receiving the feet of the vehicle operator, bearing means operatively connecting said lower frame member to said platform for supporting said frame on said platform for free cambering movement about a longitudinal roll axis coplanar with the longitudinal axis of said platform, transverse axle means rotatably supporting the central frame secured to said platform, rear wheel means underlying said seat means and supported on opposite outboard ends of said axle means for contacting said support surface to support said platform in fixed angular relationship with respect to said support surface while allowing the operator when seated to impart balancing moments through his feet while cambering said central frame and said front wheel means.

2. A cambering vehicle for transporting a vehicle operator along a support surface, said vehicle comprising a central tubular frame having an upwardly extending forward frame member and a lower frame member extending along the longitudinal axis of the vehicle rearwardly from the lower end of said forward frame member to the end of said vehicle, steerable front wheel means supported by said forward frame member for contacting said support surface, manual steering means operatively connected to said steerable front wheel means, a shell-like support platform having a centralized longitudinal axis extending to the rear of said vehicle from said forward frame member and laterally across said lower frame member for receiving the feet of the vehicle operator, bearing means pivotally connecting said lower frame member to said platform for supporting said frame on said platform for substantially unrestrained clockwise and counterclockwise pivotal movement about a longitudinal roll axis coplanar with the longitudinal axis of said vehicle, transverse rear axle means secured to said platform, rear wheel means supported on opposite outboard ends of said axle means for contacting said support surface to support said platform in fixed angular relationship with respect to said support surface while allowing said operator to stand in a natural upright manner on said platform and straddle said longitudinal roll axis to impart balancing moments while simultaneously cambering said frame and said front wheel means.

3. A cambering vehicle for transporting a vehicle operator along a support surface, said vehicle comprising a centralized main cambering frame having an upwardly extending forward frame member and a tubular lower frame member extending along the longitudinal axis of said vehicle and rearwardly from the lower end of said forward frame member, a seat for the vehicle operator, an upright for said seat extending upwardly from the trailing end portion of said lower frame member for cambering movement therewith, steerable front wheel means supported by said forward frame member for contacting said support surface, manual steering means operatively connected to said steerable front wheel means, an operator support platform extending rearwardly from said forward frame member to said upright and extending laterally across said lower frame member for receiving the feet of the vehicle operator, bearing means operatively connecting said lower frame member to said platform for supporting said cambering frame on said platform for unrestrained cambering moments about a longitudinal roll axis coplanar with the longitudinal axis of said vehicle, transverse rear axle means secured to said platform, rear wheel means supported on opposite outboard ends of said axle means for contacting said support surface to support said platform in a predetermined angular relationship with respect to said support surface while allowing said operator to sit on said seat and straddle the longitudinal roll axis to impart balancing moments while cambering said seat with said main frame and said front wheel means.

*4. In a cambering vehicle having an engine for vehicle propulsion, a cambering steering fork assembly at the front of the vehicle mounting a road wheel at the lower end thereof and manual steering means at the upper end thereof, a pair of laterally spaced rear road wheels supporting a non-cambering support platform for the feet of the vehicle operator, a cambering main frame having a forward portion operatively mounting the steering fork assembly and a cambering seat support at the rear of the vehicle for the vehicle operator connected to the main frame for cambering movement therewith about a camber axis to allow the operator to freely lean into turns while standing or seated and while cambering the vehicle with his feet on the support platform characterized in that the engine is mounted on the steering fork assembly and is drivingly connected to the front wheel of the steering fork assembly and that the support platform extends between the forward portion of the main frame and the seat support and is substantially unobstructed to facilitate operator entry and egress and operator stabilization of the vehicle during powered cambering maneuvers through foot impressed loads to the platform in the event an unbalanced condition occurs.*

*5. A cambering vehicle according to claim 4 characterized in that the seat support overlies a rearward end portion of the support platform and the rear wheels carried thereby.*

*6. A cambering vehicle according to claim 4 characterized in that the main frame includes a tubular and longitudinally extending member that is coextensive with and is pivoted to the support platform.*

*7. A cambering vehicle according to claim 6 characterized in that the support platform is a unitized shell which supports and covers the rear wheels adjacent to the rearward end thereof and which houses bearing means for said tubular member of said main frame.*

*8. A cambering vehicle according to claim 7 characterized in that the main frame extends along the longitudinal axis of the vehicle from rigid connection with the seat support at the rear of the vehicle into pivotal connection with the steering fork assembly and that the tubular member of the main frame is a lower leg portion that encompasses the cambering axis of the steering fork assembly and main frame.*

* * * * *